(12) United States Patent
Takai

(10) Patent No.: US 10,294,640 B2
(45) Date of Patent: May 21, 2019

(54) STORAGE TANK AND METHOD FOR CONSTRUCTING SAME

(71) Applicant: TOTETU MFG. CO. LTD., Tokyo (JP)

(72) Inventor: Seiichiro Takai, Tokyo (JP)

(73) Assignee: TOTETU MFG. CO. LTD., Tokyo (JP)

( * ) Notice: Subject to any disclaimer, the term of this patent is extended or adjusted under 35 U.S.C. 154(b) by 0 days.

(21) Appl. No.: 15/770,971

(22) PCT Filed: Oct. 25, 2016

(86) PCT No.: PCT/JP2016/081547
§ 371 (c)(1),
(2) Date: Apr. 25, 2018

(87) PCT Pub. No.: WO2017/073546
PCT Pub. Date: May 4, 2017

(65) Prior Publication Data
US 2018/0313065 A1    Nov. 1, 2018

(30) Foreign Application Priority Data
Oct. 29, 2015 (JP) ................................ 2015-212596

(51) Int. Cl.
*E03F 1/00* (2006.01)
*E03B 3/02* (2006.01)
(Continued)

(52) U.S. Cl.
CPC ................ *E03B 11/14* (2013.01); *E03B 3/02* (2013.01); *E03B 3/03* (2013.01); *E03B 3/06* (2013.01);
(Continued)

(58) Field of Classification Search
CPC ...... E03B 3/02; E03B 3/03; E03B 3/06; E03B 11/14; B65D 88/76; E03F 1/005
(Continued)

(56) References Cited

U.S. PATENT DOCUMENTS 9,079,708 B2 *   7/2015  Takai ..................... E03F 1/005
2005/0155285 A1 *  7/2005  Urban ................ A01G 13/0237
                                                47/32.7
(Continued)

FOREIGN PATENT DOCUMENTS

CA       2286336 A1 *  8/1998  .............. E02B 11/00
CA       2457135 A1 *  2/2002  ............. E01C 3/006
(Continued)

OTHER PUBLICATIONS

Official Communication issued in Patent Application No. PCT/JP2016/081547, dated Jan. 17, 2017 with English language translation.
(Continued)

*Primary Examiner* — Frederick L Lagman
(74) *Attorney, Agent, or Firm* — Greenblum & Bernstein, P.L.C.

(57) ABSTRACT

A storage tank according to the present invention has a concrete bottom plate laid on a bottom part of a hole dug in the ground, a storage assembly provided on the bottom plate and accommodated in the hole, a concrete quadrangular tubular side wall provided around the storage assembly on the bottom plate, and a side-wall formation member configured to form the side wall into a square frame shape. The storage assembly has a plurality of square tabular partition plates, tubular spacers connected to the partition plates, and an outermost layer part provided on the outermost side of the storage assembly. The side-wall formation member has quadrangular tubular multi-step inner molds formed of a
(Continued)

plurality of first plate members, a plurality of vertical reinforcing bars inserted into the multi-step partition plates, and a quadrangular tubular single-step outer mold which holds a plurality of second plate members by a plurality of separators.

12 Claims, 11 Drawing Sheets

(51) Int. Cl.
*B65D 88/76* (2006.01)
*E03B 3/06* (2006.01)
*E03B 11/14* (2006.01)
*E03B 3/03* (2006.01)

(52) U.S. Cl.
CPC .............. *E03F 1/005* (2013.01); *B65D 88/76* (2013.01); *Y02A 20/106* (2018.01); *Y02A 20/108* (2018.01)

(58) Field of Classification Search
USPC ...................................................... 405/53, 55
See application file for complete search history.

(56) References Cited

U.S. PATENT DOCUMENTS

| | | | | |
|---|---|---|---|---|
| 2008/0166182 A1* | 7/2008 | Smith | .................... | E03F 1/005 405/36 |
| 2009/0279953 A1* | 11/2009 | Allard | .................... | E03F 1/005 405/39 |
| 2010/0200600 A1* | 8/2010 | Hoekstra | ................. | E03F 1/005 220/676 |
| 2013/0152499 A1* | 6/2013 | Kriekemeier | .......... | E03F 1/005 52/588.1 |
| 2013/0284750 A1 | 10/2013 | Takai | | |
| 2017/0321397 A1* | 11/2017 | Kent | ....................... | E03F 1/002 |

FOREIGN PATENT DOCUMENTS

| | | | | |
|---|---|---|---|---|
| CA | 2822601 A1 * | 8/2012 | .............. | E03F 1/005 |
| EP | 1743984 A1 * | 1/2007 | ............... | E03B 3/03 |
| JP | H 2-197629 A | 8/1990 | | |
| JP | H 5-179677 A | 7/1993 | | |
| JP | 2005-290677 A | 10/2005 | | |
| JP | 2008-255767 A | 10/2008 | | |
| JP | 2013-167106 A | 8/2013 | | |
| WO | 2011/129019 A1 | 10/2011 | | |
| WO | WO-2011129019 A1 * | 10/2011 | ............... | E03B 3/03 |
| WO | 2012/111465 | 8/2012 | | |

OTHER PUBLICATIONS

Official Communication issued in Patent Application No. PCT/JP2016/081547, dated May 1, 2018 with English language translation.

* cited by examiner

STORAGE TANK AND METHOD FOR CONSTRUCTING SAME

TECHNICAL FIELD

The present invention relates to a storage tank buried in the ground to store rain water and the like, and a method for constructing this storage tank. It is to be noted that the present international application claims priority based on Japanese Patent Application No. 212596 (Japanese Patent Application No. 2015-212596) filed on Oct. 29, 2015, and all contents of Japanese Patent Application No. 2015-212596 are applied to the present international application.

BACKGROUND ART

There has been conventionally disclosed a storage assembly which is loaded in a storage tank and in which a cylindrical rib is protruded on each of a lower surface and an upper surface of each partition plate, funnel-shaped end spacers each of which has a large-diameter portion which is connected to the upper and lower surfaces of the partition plate while being fitted to the cylindrical ribs and a small-diameter portion having a diameter smaller than that of the large-diameter portion, and both ends of a cylindrical coupling spacer are fitted to small-diameter portions of a pair of end spacers (see, e.g., Patent Literature 1). In this storage assembly, assuming that a length of one side of the partition plate is S, a diameter of a portion where the cylindrical rib is fitted to the large-diameter portion is set to fall within the range of 0.40 S to 0.95 S. Further, horizontal coupled bodies, each of which is constituted by aligning a plurality of partition plates on the same horizontal plane and coupling them, are provided on a plurality of steps, and the end spacers and the coupling spacers are interposed between the horizontal coupled bodies on the plurality of steps. Furthermore, styrene foam plates are arranged to abut on outermost surfaces of the plurality of end spacers placed on the outermost sides in the plurality of end spacers of the storage assembly loaded in the storage tank, the styrene foam plates are configured to surround the end spacers and the coupling spacers in accordance with each space between the horizontal coupled bodies on the plurality of steps.

In the thus configured storage assembly, the partition plates, the end spacers, and the coupling spacers receive a partial pressure in a vertical direction in external force which acts on the storage assembly, and the horizontal coupled bodies mainly receive a partial pressure in a horizontal direction in the external force which acts on the storage assembly. Consequently, even the storage assembly formed by assembling members having relatively simple shapes can assure strength as a relatively large structure. Moreover, in the storage tank loaded with the storage assembly, when the storage assembly and the styrene foam plate are wrapped with an impervious sheet, even if the partial pressure in the horizontal direction in the external pressure acting on the storage assembly acts in a direction to be pressure-welded to the impervious sheet, large-area planes of the styrene foam plates receive this external pressure. Consequently, damage to the impervious sheet can be avoided.

CITATION LIST

Patent Literature

Patent Literature 1: International Publication No. WO 2012/111465 (claim 1, paragraphs [0020], [0027], and [0066], and FIG. 1, FIG. 6, and FIG. 10)

DISCLOSURE OF INVENTION

Problem to be Solved by the Invention

In the storage assembly disclosed in Patent Literature 1 of the prior art, since the styrene foam plates receive the partial pressure in the horizontal direction of an earth pressure, when the partial pressure in the horizontal direction increases, there is a fear that the styrene foam plates and the storage assembly are damaged. Additionally, in the storage assembly disclosed in Patent Literature 1 of the prior art, in a case where both the storage assembly and the styrene foam plates are wrapped with the impervious sheet, a damaged part may be produced in the impervious sheet depending on a skill level of an operator at the time of installing the impervious sheet or incorporating the storage assembly into the impervious sheet, and rain water or the like stored in the storage tank may possibly leak out of the damaged part of the impervious sheet.

A first object of the present invention is to provide a storage tank which can avoid damage to a storage assembly by receiving a relatively large partial pressure in the horizontal direction in an earth pressure by a structurally robust concrete side wall even if the partial pressure acts on an outer peripheral surface of the storage tank, and a method for constructing the same. A second object of the present invention is to provide a storage tank which can prevent leakage of rain water or the like stored in the storage tank by using a concrete bottom plate and side wall which are hard to be damaged without using an impervious sheet which is apt to be damaged, and a method for constructing the same. A third object of the present invention is to provide a storage tank whose concrete side wall can be formed in a relatively short time by even an unskilled operator based on a relatively easy method, and a method for constructing the same.

Means for Solving Problem

As shown in FIG. 1 to FIG. 5, a first aspect of the present invention is characterized by storage tank 10 including: a concrete bottom plate 12 laid on a bottom part of a hole 11 dug in the ground; a storage assembly 20 provided on the bottom plate 12 and accommodated in the hole 11; a concrete quadrangular tubular side wall 13 provided around the storage assembly 20 on the bottom plate 12; and a side-wall formation member 60 configured to form the side wall 13 into a square frame shape, the storage assembly 20 including: a plurality of square tabular partition plates 21 each of which has at least one cylindrical rib 21a or 21b protruded on a lower surface thereof and at least one cylindrical rib 21c or 21d protruded on an upper surface thereof; tubular spacers 22 each of which is connected to one or both of the lower surface and the upper surface of each partition plate 21 while being fitted to the cylindrical ribs 21a to 21d; and an outermost layer part 51 provided on the outermost side of the storage assembly 20 by alternately arranging the partition plates 21 and the spacers 22 in a vertical direction, and the side-wall formation member including: multi-step inner molds 63 formed into a quadrangular tubular shape by arranging a plurality of first plate members 61 in such a manner that the first plate members come into contact with portions, which form an outer surface of the outermost layer part 51, of the plurality of spacers 22 constituting the outermost layer part 51 in accordance with each step between the multi-step partition plates 21 which constitute the outermost layer part 51 and are arranged at intervals in the vertical direction; a plurality of vertical reinforcing bars 64 inserted into the multi-step partition plates 21 which constitute the outermost layer part 51 and are arranged at intervals in the vertical direction in such a manner that the vertical reinforcing bars are placed on the outer side of the plurality of first plate members 61; and a single-step outer mold 66 formed into a quadrangular tubular shape by holding a plurality of second plate members 62, which are arranged on the outer side of the multi-step partition plates 21 which constitute the outermost layer part 51 and are arranged at intervals in the vertical direction, by a plurality of separators 69 to form a predetermined gap between itself and the vertical reinforcing bars 64.

Further, as shown in FIG. 1 and FIG. 2, a second aspect of the present invention is an invention based on the first aspect, and characterized in that a water stop material 74 having water swelling properties is arranged on the bottom plate 12 between the inner molds 63 and the outer mold 66, and the side wall 13 is appressed against and formed on an upper surface of the bottom plate 12 through the water stop material 74 by pouring fresh concrete into a space between the inner molds 63 and the outer mold 66 and hardening the fresh concrete.

Furthermore, as shown in FIG. 12, a third aspect of the present invention is an invention based on the first aspect, and characterized in that an impervious sheet 104 is laid on the bottom plate 12, and a peripheral edge of the impervious sheet 104 is raised by a predetermined length and buried in the side wall 13.

Moreover, as shown in FIG. 3 and FIG. 5, a fourth aspect of the present invention is an invention based on the first aspect, and characterized in that auxiliary receiving members 67 which receive the inner molds 63 together with the plurality of spacers 22 constituting the outermost layer part 51 are inserted into the multi-step partition plates 21 which constitute the outermost layer part 51 and are arranged at intervals in the vertical direction.

Additionally, as shown in FIG. 1 and FIG. 3, a fifth aspect of the present invention is an invention based on the first aspect, and characterized in that each first plate member 61 is a plastic corrugated board material, and each second plate member 62 is a steel netting.

Further, as shown in FIG. 3 and FIG. 5, a sixth aspect of the present invention is an invention based on the fifth aspect, and characterized in that a distal end of each separator 69 is bent into a U-like shape to be lockable to each vertical reinforcing bar 64, and a proximal end of each separator 69 is fixed to each steel netting 62 by inserting the proximal end of each separator 69 into each mesh of the steel netting 62 and screwing nuts 71 and 71 to the proximal end of each separator 69.

As shown in FIG. 1 to FIG. 5, a seventh aspect of the present invention is a method for constructing a storage tank 10, including: a bottom plate laying step of laying a concrete bottom plate 12 on a bottom part of a hole 11 dug in the ground; a storage assembly constructing step of constructing a storage assembly 20 on the bottom plate 12 and accommodating the storage assembly 20 in the hole 11; a side-wall formation member constructing step of constructing a side-wall formation member 60 configured to form a concrete quadrangular tubular side wall 13 surrounding the bottom assembly 20 on the bottom plate 12; and a side-wall forming step of forming the side wall 13 by pouring fresh concrete into a space between inner molds 63 and an outer mold 66 of the side-wall formation member 60 and hardening the fresh concrete, a plurality of square tabular partition plates 21 each of which has at least one cylindrical rib 21a or 21b protruded on a lower surface thereof and at least one cylindrical rib 21c or 21d protruded on an upper surface thereof and tubular spacers 22 each of which is connected to one or both of the lower surface and the upper surface of each partition plate 21 while being fitted to the cylindrical ribs 21a to 21d being prepared before the storage assembly constructing step, the storage assembly constructing step including a step of providing an outermost layer part 51 by alternately arranging the partition plates 21 and the spacers 22 in a vertical direction on the outermost side of the storage assembly 20, the side-wall formation member constructing step including: an inner mold forming step of forming each of multi-step inner molds 63 into a quadrangular tubular shape by arranging a plurality of first plate members 61 in such a manner that the first plate members come into contact with portions, which form an outer surface of the outermost layer part 51, of the plurality of spacers 22 constituting the outermost layer part 51 in accordance with each step between the multi-step partition plates 21 which constitute the outermost layer part 51 and are arranged at intervals in the vertical direction; a vertical reinforcing bar inserting step of inserting a plurality of vertical reinforcing bars 64 into the multi-step partition plates 21 which constitute the outermost layer part 51 and are arranged at intervals in the vertical direction in such a manner that the vertical reinforcing bars are placed on the outer side of the plurality of first plate members 61; and an outer frame forming step of forming a single-step outer mold 66 into a quadrangular tubular shape by holding a plurality of second plate members 62, which are arranged on the outer side of the multi-step partition plates 21 which constitute the outermost layer part 51 and are arranged at intervals in the vertical direction, by a plurality of separators 69 to form a predetermined gap between itself and the vertical reinforcing bars 64.

Furthermore, as shown in FIG. 1 and FIG. 2, an eighth aspect of the present invention is an invention based on the seventh aspect, and characterized in that the side-wall formation member constructing step further includes a water stop material arranging step of arranging a water stop material 74 having water swelling properties on the bottom plate 12 between the inner molds 63 and the outer mold 66, and the side wall 13 is appressed against and formed on an upper surface of the bottom plate 12 with the use of water swelling of the water stop material by pouring fresh concrete into a space between the inner molds 63 and the outer mold 66 and hardening the fresh concrete.

Moreover, as shown in FIG. 12, a ninth aspect of the present invention is an invention based on the seventh aspect, and characterized in that an impervious sheet 104 wider than a bottom surface of the storage assembly 20 is laid on the bottom plate 12 after the bottom plate laying step and before the storage assembly constructing step, and a plurality of horizontal reinforcing bars 68 are provided at intervals in the vertical direction in such a manner that the horizontal reinforcing bars cross the vertical reinforcing bars 64 and then a peripheral edge of the impervious sheet 104 is raised and locked to the horizontal reinforcing bars 68 after the vertical reinforcing bar inserting step and before the outer mold forming step.

Additionally, as shown in FIG. 3 and FIG. 5, a 10th aspect of the present invention is an invention based on the seventh aspect, and characterized in that auxiliary receiving members 67 configured to receive the inner molds 63 together with the plurality of spacers 22 constituting the outermost layer part 51 are inserted into the multi-step partition plates 21 which constitute the outermost layer part 51 and are arranged at intervals in the vertical direction before the inner mold forming step.

Further, as shown in FIG. 1 and FIG. 3, an 11th aspect of the present invention is an invention based on the seventh aspect, and characterized in that each first plate member 61 is a plastic corrugated board material, and each second plate member 62 is a steel netting.

Furthermore, as shown in FIG. 3 and FIG. 5, a 12th aspect of the present invention is an invention based on the 11th aspect, and characterized in that a distal end of each separator 69 is bent into a U-like shape to be lockable to each vertical reinforcing bar 64, and a proximal end of each separator 69 is fixed to each steel netting 62 by inserting the proximal end of each separator 69 into each mesh of the steel netting 62 and screwing nuts 71 and 71 to the proximal end of each separator 69.

Effect of the Invention

In the storage tank according to the first aspect of the present invention and the method for constructing a storage tank according to the seventh aspect of the present invention, the multi-step inner molds are formed into a quadrangular tubular shape by arranging the plurality of first plate members in such a manner that the first plate members come into contact with the portions, which form the outer surface of the outermost layer part, of the plurality of spacers constituting the outermost layer part in accordance with each step between the multi-step partition plates constituting the outermost layer part, the plurality of vertical reinforcing bars are inserted into the multi-step partition plates which constitute the outermost layer part and are vertically arranged at intervals, the plurality of second plate members arranged on the outer side of the multi-step partition plates which constitute the outermost layer part and are vertically arranged at intervals are held by the plurality of separators with a predetermined gap from the vertical reinforcing bars to form the single-step outer mold into a quadrangular tubular shape, and hence pouring fresh concrete into the space between the inner molds and the outer mold and hardening it enables forming the side wall on the upper surface of the bottom plate, thereby substantially simultaneously progressing a storage assembly constructing step, a side-wall formation member constructing operation, and a side-wall forming operation. Consequently, even an unskilled operator can form the side wall made of concrete in a relatively short time by a relatively simple method. Further, even if the relatively large partial pressure in the horizontal direction in the earth pressure acts on the outer peripheral surface of the storage tank, since the structurally robust concrete side wall receives the partial pressure, the storage assembly can be prevented from being damaged. Furthermore, since the concrete side wall is supported by the storage assembly in the storage tank, a thickness of the side wall can be suppressed to the requisite minimum.

In the storage tank according to the second aspect of the present invention and the method for constructing a storage tank according to the eighth aspect of the present invention, the water stop material having water swelling properties is arranged on the bottom plate between the inner molds and the outer mold, the side wall is appressed against and formed on the upper surface of the bottom plate through the water stop material by pouring the fresh concrete into the space between the inner molds and the outer mold and hardening the fresh concrete, and hence the bottom plate and the side wall which are made of concrete and the water stop material interposed between the bottom plate and the side wall can assuredly prevent rain water and the like in the storage tank from leaking when the rain water and the like are stored in this storage tank.

In the storage tank according to the third aspect of the present invention and the method for constructing a storage tank according to the ninth aspect of the present invention, the impervious sheet wider than the bottom surface of the storage assembly is laid on the bottom plate after the bottom plate laying step and before the storage assembly constructing step, the plurality of horizontal reinforcing bars are provided at intervals in the vertical direction in such a manner that the horizontal reinforcing bars cross the vertical reinforcing bars and then the peripheral edge of the impervious sheet is raised and locked to the horizontal reinforcing bars after the vertical reinforcing bar inserting step and before the outer frame forming step, the fresh concrete is poured into the space between the inner molds and the outer mold and hardened and the peripheral edge of the impervious sheet is raised by a predetermined length and buried in the side wall after the outer mold forming step, and hence the impervious sheet on the concrete bottom plate and the concrete side wall can assuredly prevent the rain water and the like in the storage tank from leaking when the rain water and the like are stored in this storage tank.

In the storage tank according to the fourth aspect of the present invention and the method for constructing a storage tank according to the 10th aspect of the present invention, since the auxiliary receiving members which receive the inner molds together with the plurality of spacers constituting the outermost layer part are inserted into the multi-step partition plates which constitute the outermost layer part and are arranged at intervals in the vertical direction, the spacers and the auxiliary receiving members receive a pressure of the fresh concrete acting on the inner molds when the fresh concrete is poured into the space between the inner molds and the outer mold. Consequently, the storage assembly can be assuredly prevented from deforming at the time of pouring the fresh concrete into the space between the inner molds and the outer mold.

In the storage tank according to the fifth aspect of the present invention and the method for constructing a storage tank according to the 11th aspect of the present invention, the plastic corrugated board material which has a relatively light weight and relatively high strength is used as each first plate member, and the steel netting which has a relatively light weight and relatively high strength is used as each second plate member, and hence conveyance and installation of the first plate members and the second plate members can be relatively easily performed.

In the storage tank according to the sixth aspect of the present invention and the method for constructing a storage tank according to the 12th aspect of the present invention, since the distal end of each separator is bent into a U-like shape so that it can be locked to each vertical reinforcing bar, the proximal end of each separator is inserted into each mesh of the steel netting, and the nuts are screwed to the proximal end of each separator to fix the proximal end of each separator to the steel netting, the outer mold can be assuredly held by the separators without performing a boring operation to insert the separators into the second plate members (the steel netting), and a gap between the vertical reinforcing bars and the outer mold, i.e., a gap between the inner molds and the outer mold can be relatively easily set to a predetermined gap by the separators.

BEST MODE(S) FOR CARRYING OUT THE INVENTION

A mode for carrying out the present invention will now be described with reference to the drawings.

First Embodiment

Figure 1:
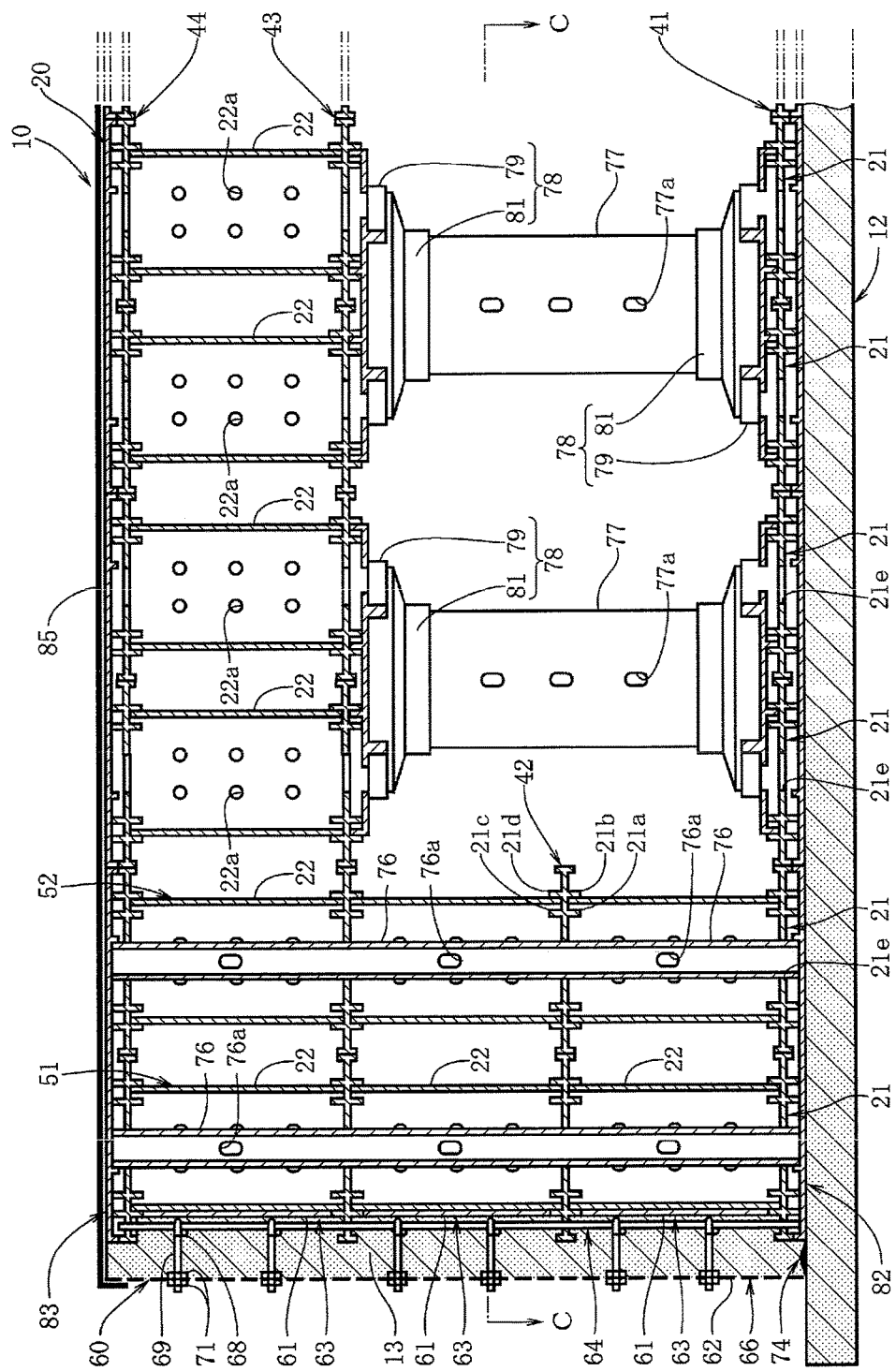
FIG. 1 is an enlarged view of a part A in FIG. 2 showing a storage tank according to a first embodiment of the present invention, and also a cross-sectional view taken along a line B-B in FIG. 3.
Figure 2:
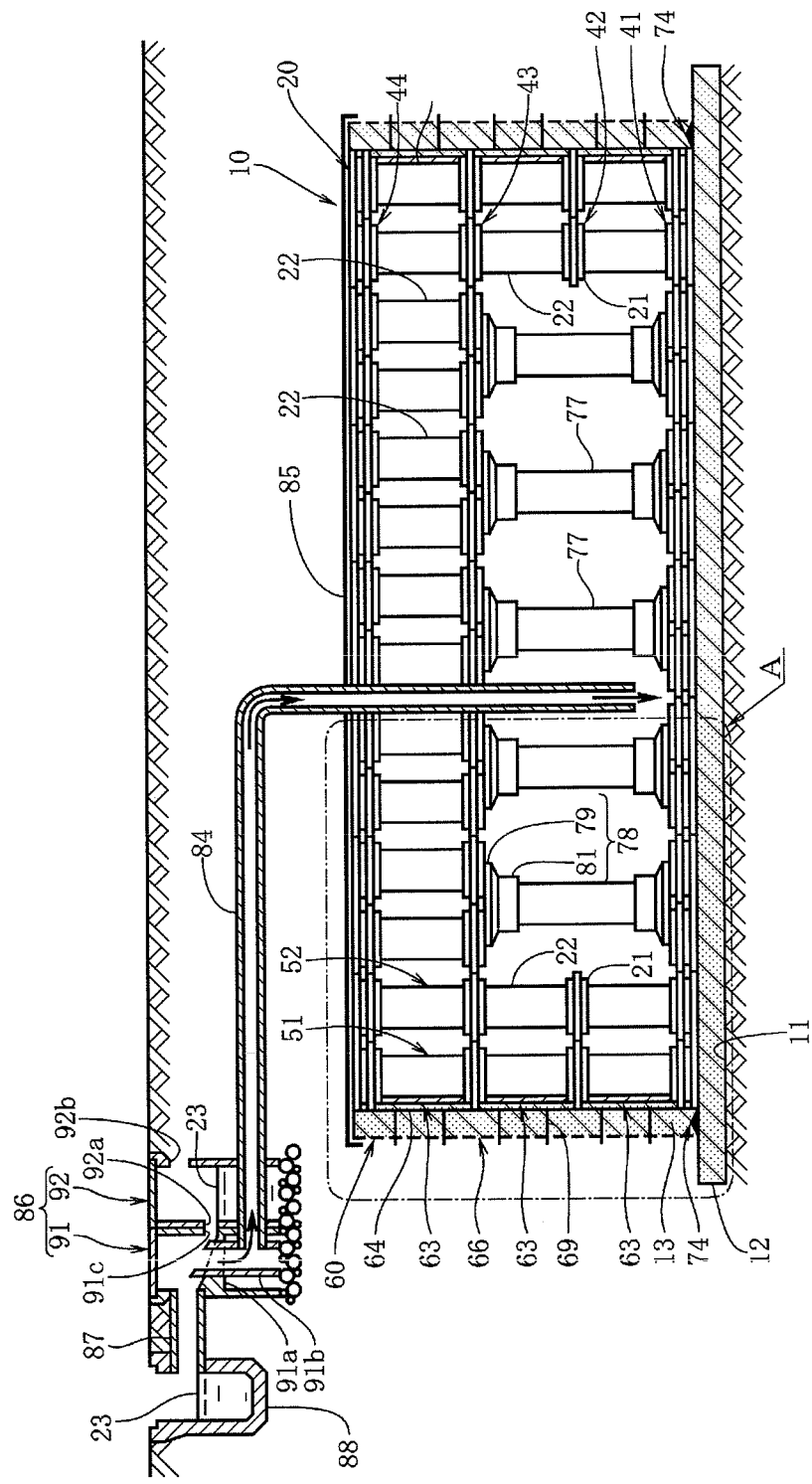
FIG. 2 is a longitudinal cross-sectional view of primary parts including the storage tank buried in the ground.

As shown in FIG. 1 and FIG. 2, a storage tank 10 includes a concrete bottom plate 12 laid on a bottom part of a hole 11 dug in the ground, a storage assembly 20 which is provided on this bottom plate 12 and accommodated in the hole 11, a concrete quadrangular tubular side wall 13 which is provided on the bottom plate 12 to surround the storage assembly 20, and a side-wall formation member 60 configured to form this side wall 13 into a square frame shape. As shown in FIG. 1, the storage assembly 20 has a plurality of partition plates 21 each having at least one cylindrical rib 21a or 22b protruded on a lower surface thereof and at least one cylindrical rib 21c or 21d protruded on an upper surface thereof, and tubular spacers 22 each of which is connected to one or both of the lower surface and the upper surface of each partition plate 21 while being fitted to each of the cylindrical ribs 21a to 21d.

In this embodiment, two large and small cylindrical ribs, i.e., the cylindrical ribs 21a and 21b are concentrically formed on the lower surface of each partition plate 21, and two large and small cylindrical ribs, i.e., the cylindrical ribs 21c and 21d are concentrically formed on the upper surface of each partition plate 21 (FIG. 1, FIG. 3, and FIG. 5 to FIG. 8). Specifically, the small-diameter first cylindrical rib 21a and the large-diameter second cylindrical rib 21b are formed on the lower surface of the partition plate 21, and the small-diameter third cylindrical rib 21c and the large-diameter fourth cylindrical rib 21d are formed on the upper surface of the partition plate 21. A diameter of the first cylindrical rib 21a and a diameter of the third cylindrical rib 21c are formed to be equal to each other. Further, a diameter of the second cylindrical rib 21b and a diameter of the fourth cylindrical rib 21d are formed to be equal to each other and larger than the diameters of the first and third cylindrical ribs 21a and 21c. Furthermore, an insertion hole 21e into which a later-described main shaft pipe 76 can be inserted is formed at a center of each partition plate 21 (FIG. 1 and FIG. 3 to FIG. 6). Reference sign 21f in FIG. 3 and FIG. 5 to FIG. 8 denotes a flow hole through which rain water 23 (FIG. 2) can pass, the plurality of flow holes 21f are formed in the partition plate 21, and reference sign 21g in FIG. 6 to FIG. 8 denotes an engagement hole which is formed at each of four corner portions of the partition plate 21 and with which a first engaging protrusion 31b of a later-described first coupling piece 31 or a second engaging protrusion 32b of a second coupling piece 32 can engage. Moreover, the partition plate 21 is made of a polyolefin resin (polypropylene, polyethylene, or the like), a vinyl chloride resin, and the like.

Figure 4:
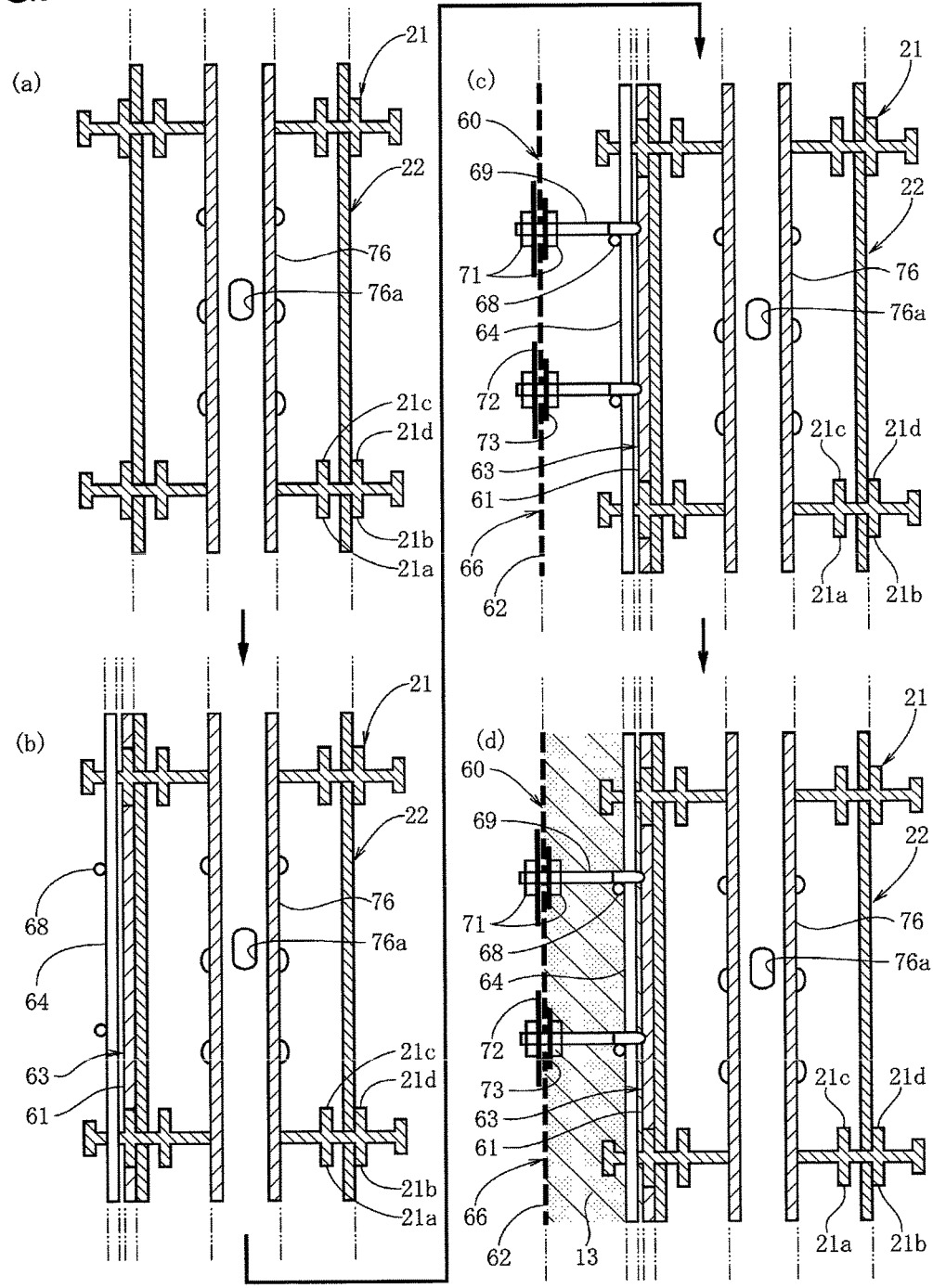
FIG. 4 is enlarged cross-sectional views of primary parts in FIG. 1 showing a procedure of constructing a side-wall formation member of the storage tank to form a side wall.

In this embodiment, the spacer 22 is formed into a cylindrical shape and configured in such a manner that its upper end is fitted to the large-diameter second cylindrical rib 21b of the partition plate 21 and its lower end is fitted to the large-diameter fourth cylindrical part 21d of another partition plate 21 (FIG. 1 and FIG. 4). Additionally, a plurality of flow holes 22a through which the rain water 23 (FIG. 2) can pass are formed in an outer peripheral surface of each spacer 22. The spacer 22 is made of a polyolefin resin (polypropylene, polyethylene, or the like), a vinyl chloride resin, and the like.

On the other hand, a first concave part 21h and a first convex part 21i are formed side by side on an upper portion of an outer peripheral surface, i.e., each of four outer side surfaces of the partition plate 21, and a second convex part 21j and a second concave part 21k are formed side by side on a lower portion of each of the four outer side surfaces (FIG. 4 to FIG. 7, FIG. 10, and FIG. 11). The second convex part 21j is placed below the first concave part 21h, and the second concave part 21k is placed below the first convex part 21i. Further, the plurality of partition plates 21 are aligned on the same horizontal plane and coupled with each other, thereby constituting horizontal coupled bodies 41 to 44. At this time, the first convex part 21i and the first concave part 21h of the partition plate 21 are loosely inserted into and loosely fitted to the first concave part 21h and the first convex part 21i of the neighboring partition plate 21, and the second concave part 21k and the second convex part 21j of the partition plate 21 are loosely fitted to and loosely inserted into the second convex part 21j and the second concave part 21k of the neighboring partition plate 21, respectively. Consequently, the partition plate 21 and the neighboring partition plate 21 can be prevented from moving within the plane where they are in contact with each other, namely, the partition plate 21 and the neighboring partition plate 21 can be prevented from relatively moving in an up-and-down direction and a left-and-right direction.

Figure 3:
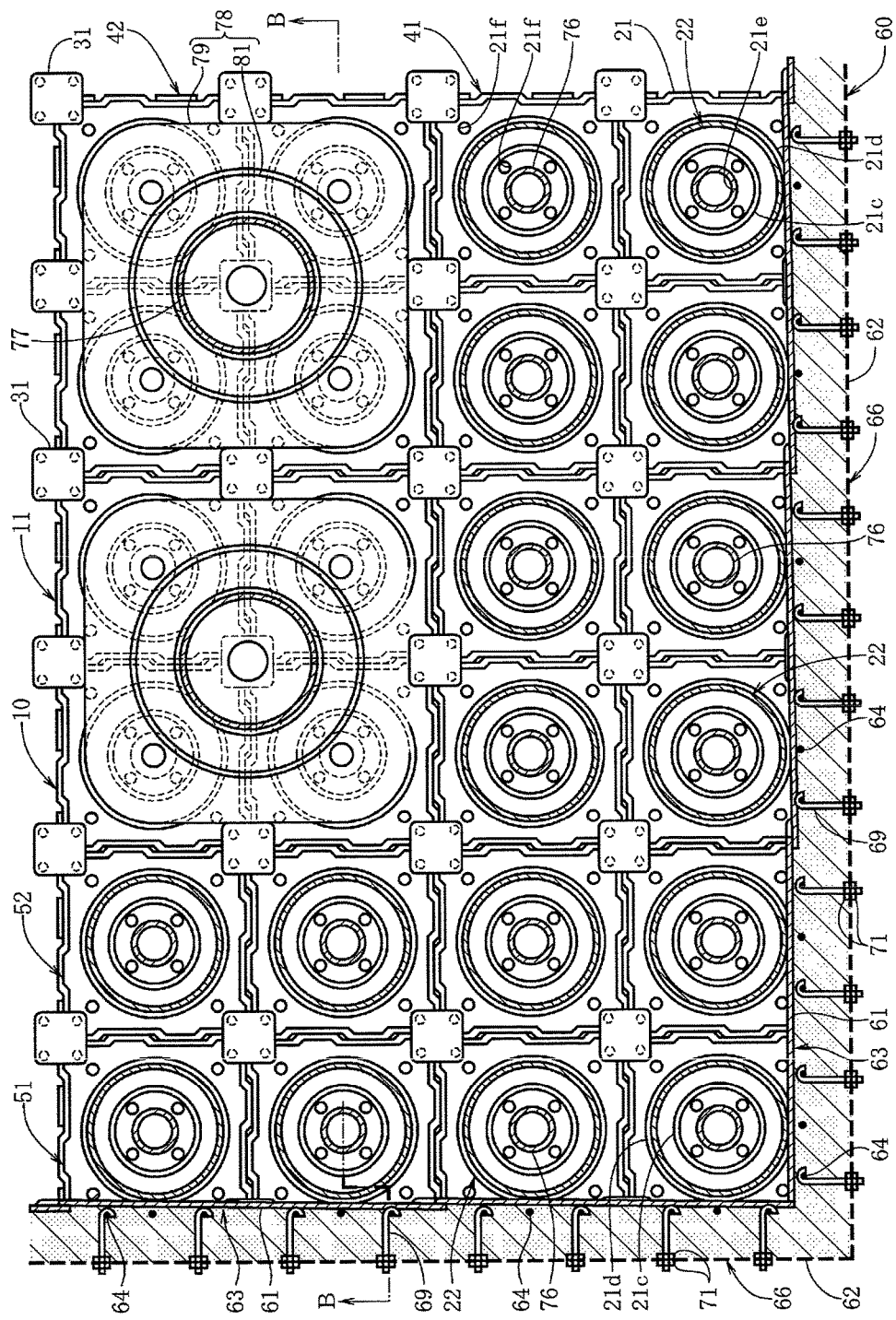
FIG. 3 is a cross-sectional view taken along a line C-C in FIG. 1.
Figure 5:
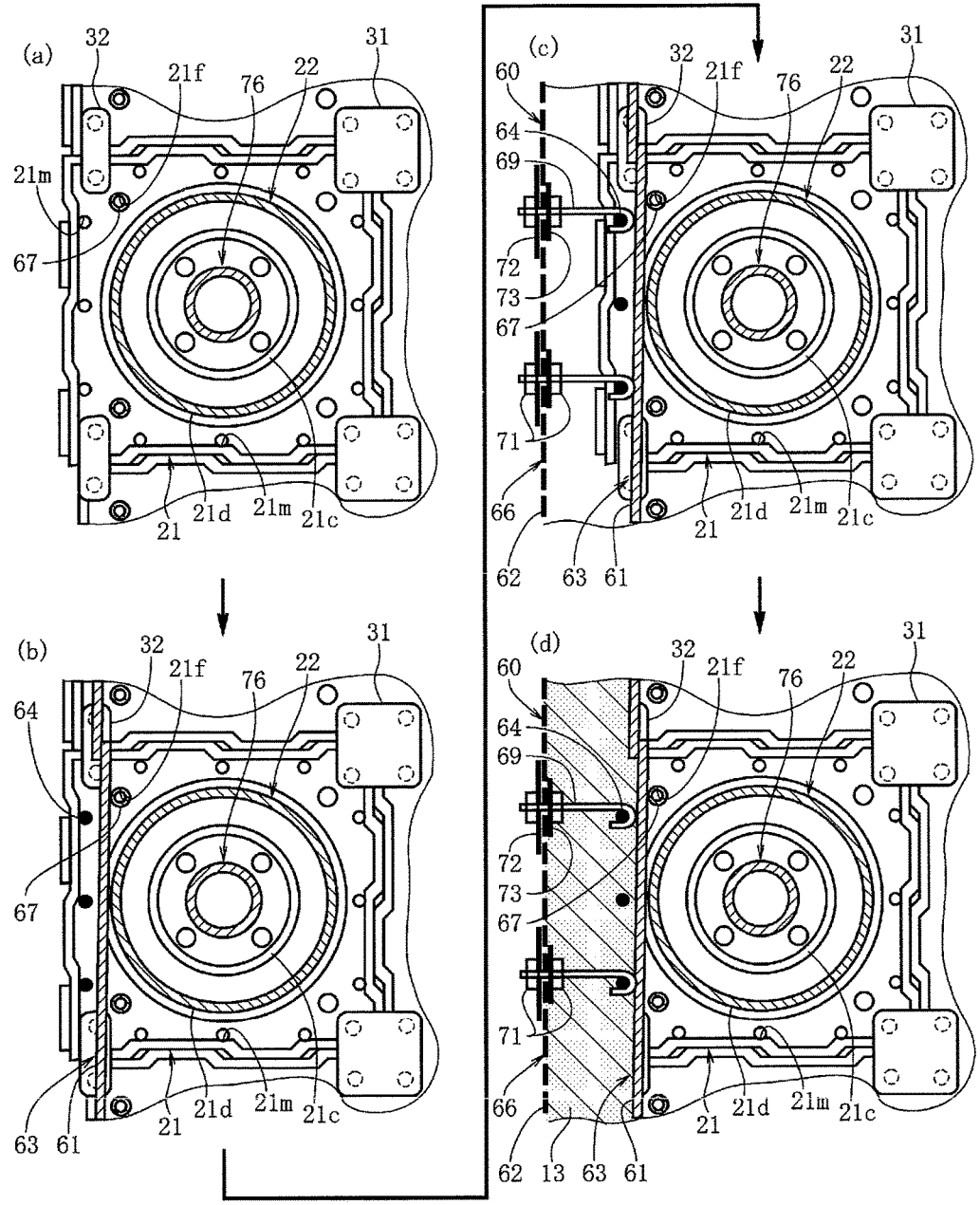
FIG. 5 is enlarged cross-sectional views of primary parts in FIG. 3 showing the procedure of constructing the side-wall formation member of the storage tank to form the side wall.
Figure 7:
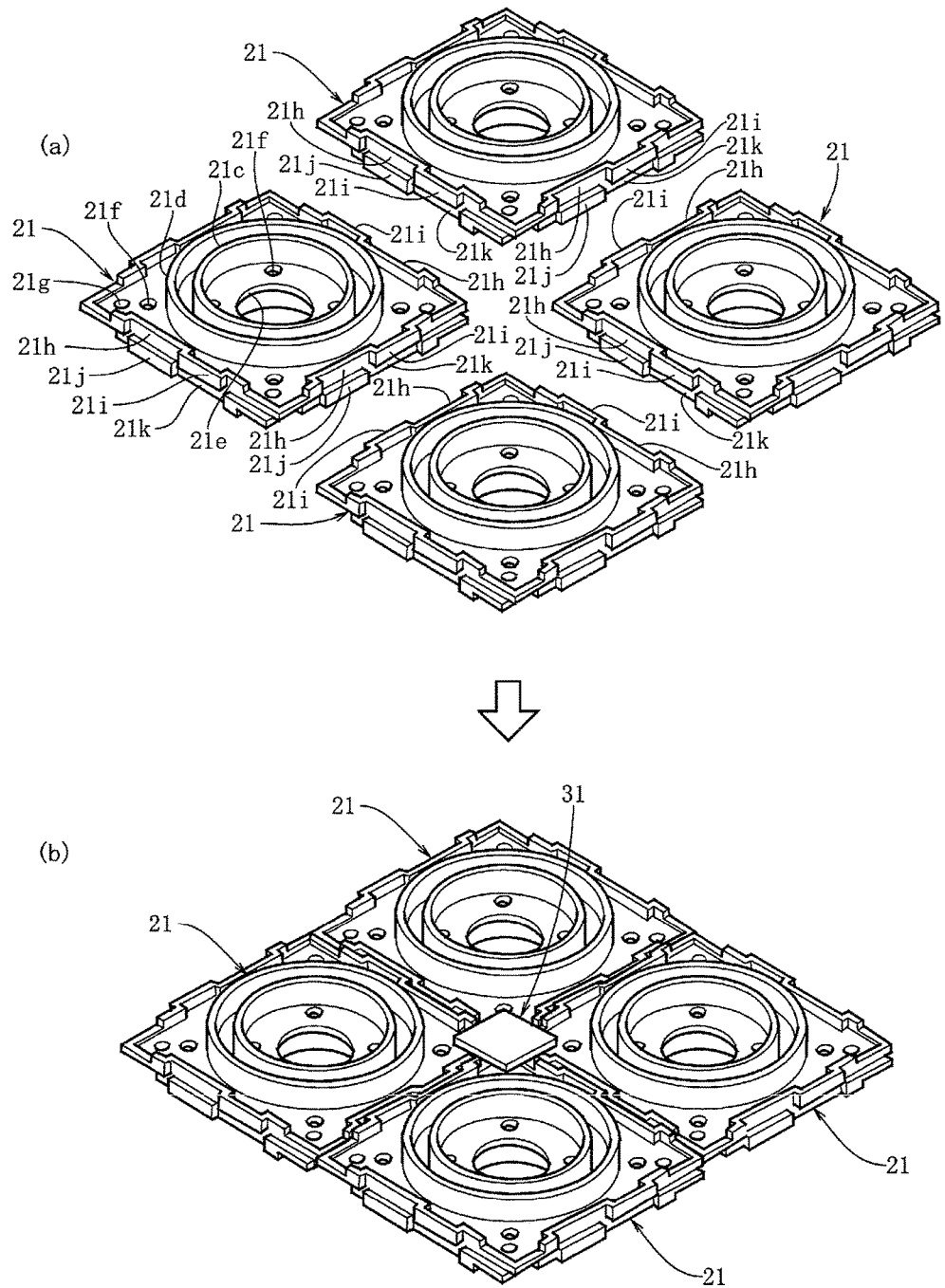
FIG. 7 are perspective views showing (a) a state immediately before and (b) a state immediately after coupling four partition plates adjacent to each other within the same horizontal plane by using a first coupling piece.
Figure 8:
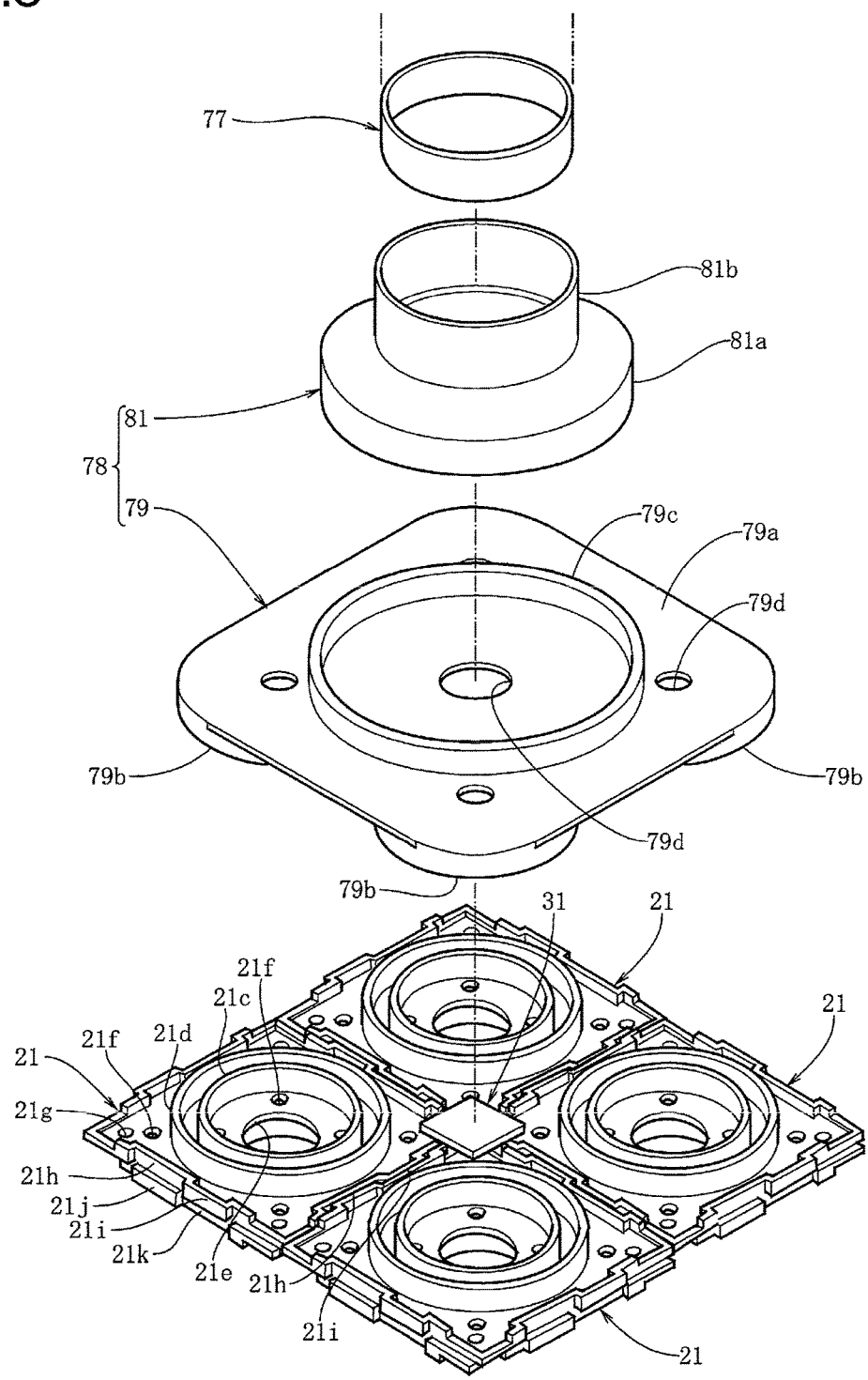
FIG. 8 is a perspective view of primary parts showing a state immediately before coupling a long spacer to an upper side of the four partition plates coupled by the first coupling piece through a coupling adaptor.
Figure 9:
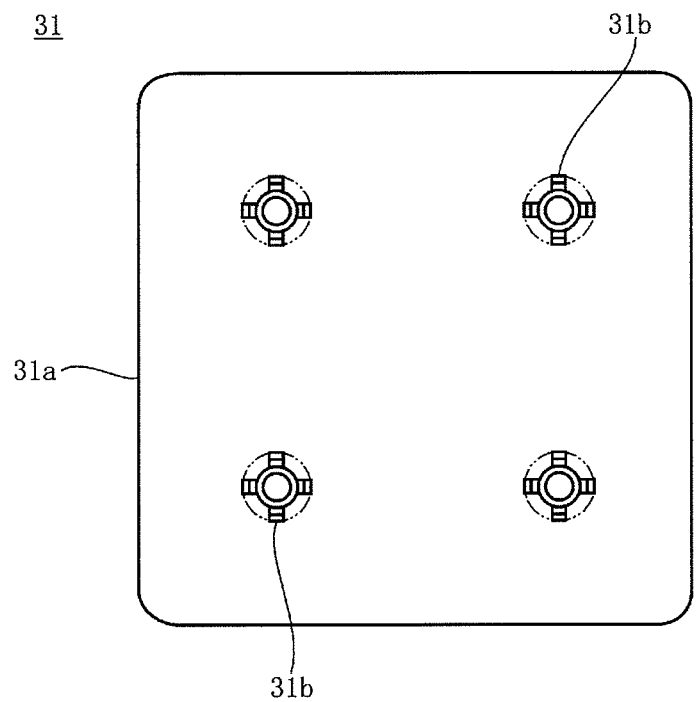
FIG. 9 is a bottom view of the first coupling piece which couples respective corner portions of the four partition plates which are adjacent to each other within the same horizontal plane.
Figure 10:
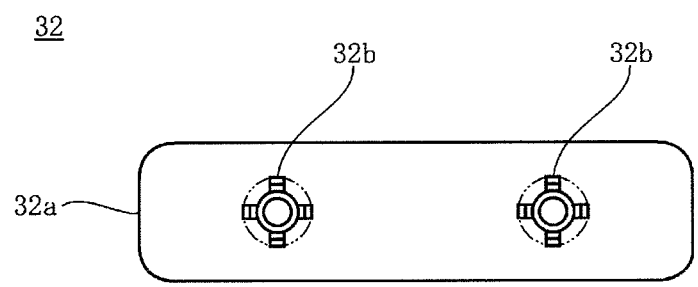
FIG. 10 is a bottom view of a second coupling piece which couples respective outer corner portions of two partition plates which are placed on the outermost side and adjacent to each other within the same horizontal plane.
Figure 11:
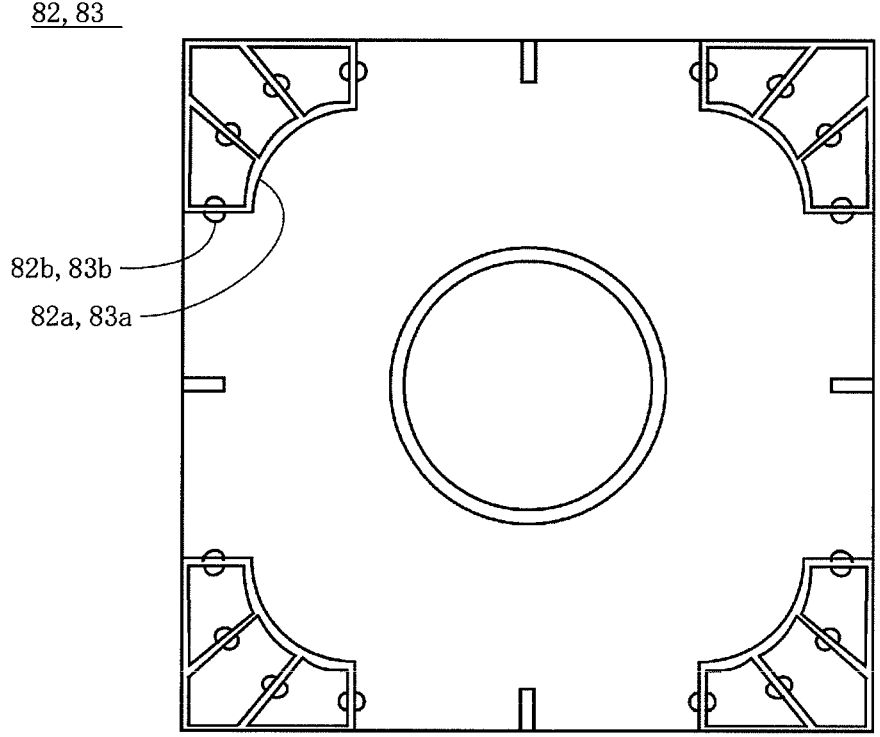
FIG. 11 is a bottom view and a plan view of a top plate and a base plate which are uniformly formed.

The plurality of partition plate 21 placed within the same horizontal plane are coupled with each other by first coupling pieces 31 or second coupling pieces 32 (FIG. 3, FIG. 5, FIG. 7, and FIG. 8). That is, respective corner portions of the four partition plates 21 which are adjacent to each other within the same horizontal plane are coupled with each other by the first coupling pieces 31, and respective corner portions of the two partition plates 21 which are placed on the outermost side and adjacent to each other within the same horizontal plane are coupled with each other by the second coupling pieces 32. The first coupling piece 31 has a first coupling main body 31a formed into a square tabular shape and first engaging protrusions 31b protruded at four corner portions of one surface of the first coupling main body 31a (FIG. 3, FIG. 7, and FIG. 9). When the first engaging protrusions 31b are thrusted and inserted into the engagement holes 21g of the partition plate 21, the first engaging protrusions 31b engage with the engagement holes 21g of the partition plate 21 and do not come off. On the other hand, the second coupling piece 32 has a second coupling main body 32a formed into a rectangular tabular shape and second engaging protrusions 32b protruded at two corner portions of one surface of the second coupling main body 32a (FIG. 3, FIG. 5, and FIG. 10). The second engaging protrusions 32b are formed into the same shape as the first engaging protrusions 31b, and thrusting and inserting the second engaging protrusions 32b into the engagement holes 21g of the partition plate 21 enables engaging the second engaging protrusions 32b with the engagement holes 21g of the partition plate 21 so that they do not come off. Furthermore, the first and second coupling pieces 31 and 32 are molded by using a polyolefin resin (polypropylene, polyethylene, or the like), a vinyl chloride resin, and the like.

In this embodiment, the horizontal coupled bodies 41 to 44 are provided on four steps, and consist of the first horizontal coupled body 41 on the lowermost step, the second horizontal coupled body 42 on a second step from the bottom, the third horizontal coupled body 43 on a third step from the bottom, and the horizontal coupled body 44 on a fourth step from the bottom (the uppermost step) (FIG. 1 and FIG. 2). Each of the first, third, and fourth horizontal coupled bodies 41, 43, and 44 is formed into a square tabular shape, and the second horizontal coupled body 42 is formed into a square frame shape. Moreover, in this embodiment, the outermost layer part 51 is provided on the outermost side of the storage tank 10, and an inside outer layer part 52 is provided to be adjacent to the inner side of this outermost layer part 51. The outermost layer part 51 and the inside outer layer part 52 are constituted by alternately arranging the partition plates 21 and the spacers 22 in the vertical direction. That is, the outermost layer part 51 and the inside outer layer part 52 includes not only the partition plates 21 and the spacers 22 which are laminated in the vertical direction between the partition plate 21 constituting the first horizontal coupled body 41 on the lowermost step and the partition plate 21 constituting the fourth horizontal coupled body 44 on the uppermost step but also the partition plate 21 constituting the first horizontal coupled body 41 and the partition plate 21 constituting the fourth horizontal coupled body 44 on the uppermost step. Additionally, the partition plates 21 on the inner side of the inside outer layer part 52 are arranged to skip one step in the vertical direction. Consequently, the second horizontal coupled body 42 is formed into a square frame shape consisting of the partition plates 21 constituting the outermost layer part 51 and the inside outer layer part 52 alone without arranging the partition plates 21 on the inner side of the inside outer layer part 52.

On the other hand, the side-wall formation member 60 has multi-step inner molds 63 formed into a quadrangular tubular shape by arranging a plurality of first plate members 61, a plurality of vertical reinforcing bars 64 inserted into the multi-step partition plates 21 which constitute the outermost layer part 51 and are arranged at intervals in the vertical direction, and a quadrangular tubular single-step outer mold 66 having a plurality of second plate members 62 provided to form a predetermined gap from the vertical reinforcing bars 64 (FIG. 1 and FIG. 3 to FIG. 5). In this embodiment, the multi-step inner molds 63 are provided on three steps (FIG. 1), and these inner molds 63 are formed into the quadrangular tubular shape by arranging the first plate members 61 in such a manner that the first plate members come into contact with portions, which form an outer surface of the outermost layer part 51, of the plurality of spacers 22 constituting the outermost layer part 51, i.e., that they come into line contact with the outer surfaces of the plurality of spacers 22 constituting the outermost layer part 51 in a state where all of the plurality of spacers 22 constituting the outermost layer part 51 are surrounded in accordance with each step between the four-step partition plates 21 which constitute the outermost layer part 51 and are arranged at intervals in the vertical direction (FIG. 1 and FIG. 3 to FIG. 5). It is preferable for the first plate members 61 to be formed of a plastic corrugated board which has a relatively light weight and relatively high strength and is made of polypropylene, and the first plate members 61 and 61 adjacent to each other are arranged in such a manner that they partially overlap each other as shown in FIG. 3 and FIG. 5. Here, it is preferable for a plurality of auxiliary receiving members 67 which receive the inner molds 63 together with the spacers 22 constituting the outermost layer part 51 to be inserted into the partition plates 21 constituting the outermost layer part 51 (FIG. 5). The auxiliary receiving members 67 are inserted into two flow holes 21f and 21f, which are parallel to one side forming the outer surface of the outermost layer part 51, of the flow holes 21f formed in the multi-step partition plates 21 which constitute the outermost layer part 51 and are arranged at intervals in the vertical direction. One auxiliary receiving member 67 is inserted into the flow holes 21f of the four partition plates 21 which constitute the outermost layer part 51 and are arranged at intervals in the vertical direction. It is to be noted that each auxiliary receiving member 67 is preferably formed of a tube made of vinyl chloride.

Further, a plurality of through holes 21m are formed in each square partition plate 21 along its four sides at intervals (FIG. 5). The vertical reinforcing bars 64 are inserted into the plurality of through holes 21m which are parallel to one side, which forms the outer surface of the outermost layer part 51, of each partition plate 21 constituting the outermost layer part 51, respectively. One vertical reinforcing bar 64 is inserted into the through holes 21m of the four partition plates 21 which constitute the outermost layer part 51 and are arranged at intervals in the vertical direction (FIG. 1). Consequently, the plurality of first plate members 61 are held by the spacers 22 and the auxiliary receiving members 67 which constitute the outermost layer part 51 and the vertical reinforcing bars 64 (FIG. 1 and FIG. 3 to FIG. 5). Here, reference sign 68 in FIG. 1 and FIG. 4 denotes a plurality of horizontal reinforcing bars which are provided at intervals in the vertical direction, extend in the horizontal direction and cross the plurality of vertical reinforcing bars 64. These horizontal reinforcing bars 68 are fixed at portions where they intersect the vertical reinforcing bars 64 by binding wires (not shown).

Further, the single-step outer mold 66 is formed into the quadrangular tubular shape by holding the plurality of second plate members 62 arranged on the outer side of the multi-step partition plates 21, which constitute the outermost layer part 51 and are arranged at intervals in the vertical direction, to form a predetermined gap from the vertical reinforcing bars 64 with the use of a plurality of separators 69 (FIG. 1 and FIG. 3). That is, the single-step outer mold 66 is formed to surround all of the three-step inner molds 63. It is preferable for the second plate members 62 to be formed of a steel netting which is provided by processing a metal plate such as a galvanized steel sheet or a stainless steel sheet into a net-like shape and has a relatively light weight and relatively high strength. Furthermore, each separator 69 is formed of a metal rod having a male screw (not shown) formed at a proximal end thereof. A distal end of this separator 69 is bent into a U-like shape in such a manner that it can be locked to each vertical reinforcing bar 64 (FIG. 3 and FIG. 5), and the proximal end of the separator 69 is inserted into a mesh of the steel netting 62 (FIG. 1 and FIG. 3 to FIG. 5). Here, when two nuts 71 and 71 are screwed to the proximal end of the separator 69 to hold the steel netting 62, the proximal end of the separator 69 is fixed to the steel netting 62. It is to be noted that reference sign 72 in FIG. 4 and FIG. 5 denotes a large washer which comes into contact with the outer surface of the steel netting 62 and has a relatively large area, and reference sign 73 denotes a small washer which comes into contact with the inner surface of the steel netting 62 and has an area smaller than that of the large washer 72. The large washer 72 is provided on the outer surface of the steel netting 62 to prevent each separator 69 from coming off the steel netting 62 due to a pressure acting on the steel netting 62 when fresh concrete is poured into a space between the inner molds 63 and the outer mold 66.

Again referring to FIG. 1 and FIG. 2, a water stop material 74 having water swelling properties is arranged in a square frame shape on the bottom plate 12 between the inner molds 63 and the outer mold 66. This water stop material 74 is made of an inorganic clay mineral mainly containing bentonite, and it is preferable for a transverse cross-sectional shape of this water stop material 74 to be formed into a substantially triangular shape in a state before pouring the fresh concrete. The side wall 13 is appressed against and formed to the upper surface of the bottom plate 12 through the water stop material 74 by pouring the fresh concrete into a space between the inner molds 63 and the outer mold 66 and hardening it.

Figure 6:
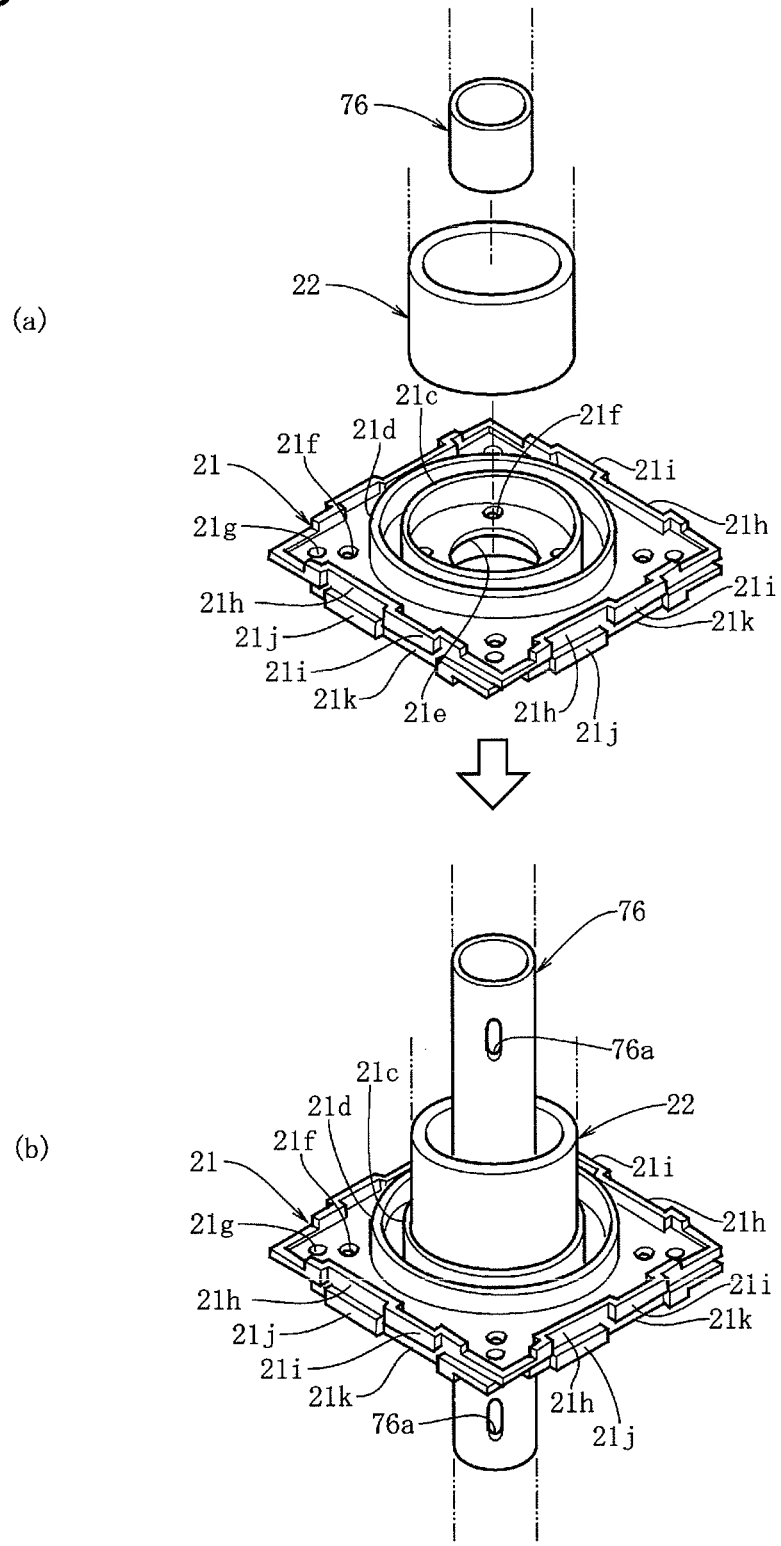
FIG. 6 are perspective views of primary parts showing (a) a state immediately before and (b) a state immediately after coupling a spacer on a partition plate in an outermost layer part and an inside outer layer part and inserting a main shaft pipe into a central hole of this partition plate, respectively.

On the other hand, the main shaft pipe 76 extending in the vertical direction is provided to pierce through the partition plates 21 and the spacers 22 constituting the outermost layer part 51 and the inside outer layer part 52 (FIG. 1 and FIG. 3 to FIG. 6). This main shaft pipe 76 is made of plastic such as polyvinyl chloride (PVC) or polypropylene (PP). An outer diameter of the main shaft pipe 76 is formed to be slightly smaller than a diameter of each insertion hole 21e of the partition plates 21. Consequently, the main shaft pipe 76 can be smoothly inserted into the insertion holes 21e of the partition plates 21. Further, a plurality of slots 76a extending in a longitudinal direction of the main shaft pipe 76 are formed at predetermined intervals in an outer peripheral surface of the main shaft pipe 76 (FIG. 1, FIG. 4, and FIG. 6). These slots 76a are formed to prevent production of an air pool in the main shaft pipe 76 by introducing the rain water or the like stored in the storage tank 10 into the main shaft pipe 76. Furthermore, a length of the main shaft pipe 76 is set to extend from the bottom surface to the upper surface of the storage tank 10 (FIG. 1). When a depth of the storage tank 10 is larger than the length of the main shaft pipe 14, they are coupled by a pipe coupling (not shown). It is to be noted that, when the storage tank 10 is relatively small and relatively low strength alone is required, the main shaft pipe 10 may be omitted.

The partition plates 21 which are placed on the inner side of the inside outer layer part 52 and constitute the first horizontal coupled body 41 on the lowermost step and the third horizontal coupled body 43 on the third step from the bottom in the four-step horizontal coupled bodies 41 to 44 are coupled through each long spacer 77 which is formed to be longer than the spacer 22 and extends in the vertical direction and each coupling adaptor 78 (FIG. 1 to FIG. 3 and FIG. 8). The long spacer 77 is formed by cutting a commercially available plastic pipe such as a VU pipe sewerage hard vinyl chloride pipe on which an internal pressure does not act) to a predetermined length. Moreover, the coupling adaptor 78 has a binding member 79 which binds the four partition plate 21 as one on the same plane and a funnel member 81 having a funnel-like shape which couples this binding member 79 with the long spacer 77. The binding member 79 has a square tabular binding main body 79a, four cylindrical first binding ribs 79b which are protruded at four corner portions of a lower surface of this binding main body 79a and can fit to the second cylindrical ribs 21b or the fourth cylindrical ribs 21d of the partition plates 21, and a single cylindrical second binding rib 79c which is formed at a center of an upper surface of the binding main body 79a and has a larger diameter than that of the first binding rib 79b. Additionally, the funnel member 81 is formed of a large-diameter rib 81a which can fit to the second binding rib 79c of the binding member 79 and a cylindrical small-diameter rib 81b which is formed integrally with this large-diameter rib 81a, has a smaller diameter than that of the large-diameter rib 81a, and can fit to the long spacer 77. Further, each of the binding member 79 and the funnel member 81 is made of a polyolefin resin (polypropylene, polyethylene, or the like), a vinyl chloride resin, and the like. Furthermore, reference sign 77a in FIG. 1 denotes a plurality of flow holes which are formed in the long spacer 77 and through which the rain water 23 (FIG. 2) can flow, and reference sign 79d in FIG. 8 denotes a plurality of flow holes which are formed in the binding main body 79a of the binding member 79 and through which the rain water 23 (FIG. 2) can flow. It is to be noted that the coupling adaptor is constituted of two members, i.e., the binding member and the funnel member in this embodiment, but a single member in which the binding member and the funnel member are integrally molded may constitute the coupling adaptor.

Square base plates 82 are laid on lower surfaces of the first horizontal coupled bodies 41 on the lowermost step, and square top plates 83 are put on upper surfaces of the fourth horizontal coupled bodies 44 on the uppermost step (FIG. 1 and FIG. 2). A lower surface of each base plate 82 is flatly formed, and engaging ribs 82a which can engage with the cylindrical ribs 21b and 21d of each partition plate 21 are protruded on an upper surface of the base plate 82. Further, an upper surface of each top plate 83 is flatly formed, and engaging ribs 83a which can engage with the cylindrical ribs 21b and 21d of each partition plate 21 are protruded on a lower surface of the top plate 83. The base plates 82 and the top plates 83 are formed into the same shape. Furthermore, each of one base plate 82 and one top plate 83 is formed to have substantially the same size as that of the four partition plates 21 bound in a square shape. Moreover, the upper surfaces of the top plates 83 are covered with an impervious sheet 85. Consequently, mud water can be prevented from entering the storage tank 10. Reference signs 82b and 83b in FIG. 11 denote a plurality of flow holes which are formed in the base plates 82 and the top plates 83 respectively and through which the rain water 23 (FIG. 2) can pass.

On the other hand, a distal end of a rain water introduction pipe 84 is inserted into the storage tank 10 (FIG. 2). A proximal end of this rainwater introduction pipe 84 is connected to a dust removal managing basin 86 which is buried in the ground at a position higher than that of the storage tank 10, and this dust removal managing basin 86 is connected to a lateral groove 88 having a substantially-U-shaped cross-section through a rain water inflow pipe 87. The dust removal managing basin 86 has a first basin 91 which has an upper side surface connected to the lateral groove 88 through the rain water inflow pipe 87 and a second basin 92 provided to be adjacent to the first basin 91. An intermediate bottom wall 91a whose upper surface tilts in a direction to gradually descend is provided at a center of the first basin 91 in the vertical direction. Further, an erecting pipe 91b is erected at a center of a bottom portion of the first basin 91 to pierce through the intermediate bottom wall 91a, and an upper end of the erecting pipe 91b is formed to tilt in substantially the same direction as the upper surface of the intermediate bottom wall 91a. Moreover, the proximal end of the rain water introducing pipe 84 is connected to a lower side surface of the erecting pipe 91b. On the other hand, a relatively small outflow hole 91c and inflow hole 92a through which a small amount of the rain water 23 (FIG. 2) flowing down on the intermediate bottom wall 91a is led into the second basin 92 at the time of light rain are formed in side surfaces of the first basin 91 and the second basin 92 which are in contact with each other. It is to be noted that reference sign 92b in FIG. 2 denotes an overflow hole formed in an upper side surface of the second basin 92.

An assembling procedure of the thus configured storage tank 10 will now be described. First, the hole 11 having a wider bottom portion than the bottom plate 12 is dug in the ground, and the concrete bottom plate 12 is laid on the bottom portion of the hole 11 (a bottom plate laying step). Then, the plurality of square tabular partition plates 21, the cylindrical spacers 22, the first coupling pieces 31, the second coupling pieces 32, the main shaft pipes 76, and others are prepared, the storage assembly 20 is constructed on the bottom plate 12, and this storage assembly 20 is accommodated in the hole 11 (a storage assembly constructing step). At this time, the outermost layer part 51 of the storage assembly 20 is first constructed on the bottom plate 12, and then the inside of the storage assembly 20 is constructed, but the side-wall formation member 60 is constructed simultaneously with the construction of the inside of this storage assembly 20 (a side-wall formation member constructing step).

A constructing procedure of the side-wall formation member 60 will now be described based on FIG. 4 and FIG. 5. First, the auxiliary receiving members 67 are inserted into the flow holes 21f which are parallel to the outer surface of the outermost layer part 51 of the partition plates 21 constituting the outermost layer part 51, respectively (FIG. 5(a)). Then, each of the three-step inner molds 63 is formed into a quadrangular tubular shape by arranging the plurality of first plate members 61 to come into contact the portions, which form the outer surface of the outermost layer part 51, of the plurality of spacers 22 which constitute the outermost layer part 51 in accordance with each step between the four-step partition plates 21 (an inner mold forming step, FIG. 4(b) and FIG. 5(b)). Further, the plurality of vertical reinforcing bars 64 are extended in the vertical direction to be placed on the outer side of the plurality of first plate members 61, and inserted into the through holes 21m which are parallel to the outer surface of the outermost layer part 51 of the multi-step partition plates 21 which constitute the outermost layer part 51 and arranged at intervals in the vertical direction (a vertical reinforcing bar inserting step, FIG. 4(b) and FIG. 5(b)). These vertical reinforcing bars 64 have a necessary main function to reinforce the side wall 13 when they are buried in the concrete side wall 13 as well as a secondary function to enhance self-standing properties of the second plate members 62 by holding the second plate members 62 with the use of the separators 69 in the side-wall formation member constructing step and a secondary function to prevent the plurality of first plate members 61 from falling due to wind or the like. Then, the water stop material 74 (FIG. 1 and FIG. 2) having wafer swelling properties is arranged on the bottom plate 12 between the inner molds 63 and the outer mold 66 (a water stop material arranging step). Furthermore, the single-step outer mold 66 is formed into a quadrangular tubular shape by holding the plurality of second plate members 62, which are arranged on the outer side of the multi-step partition plates 21 which constitute the outermost layer part 51 and are arranged at intervals in the vertical direction, by using the plurality of separators 69 to form a predetermined gap from the vertical reinforcing bars 64 (an outer mold forming step, FIG. 4(c) and FIG. 5(c)). At this time, the outer mold 66 can be assuredly held by the separators 69 without performing a boring operation for insertion of the separators 69 into the second plate members 62 (the steel netting), and the gap between the vertical reinforcing bars 64 and the outer mold 66, i.e., the gap between the inner molds 63 and the outer mold 66 can be relatively easily set to a predetermined gap by the separators 69.

Then, the fresh concrete is poured into the space between the inner molds 63 and the outer mold 66 of the side-wall formation member 60 and hardened, thereby forming the side wall 13 (a side-wall forming step, FIG. 4(d) and FIG. 5(d)). At this time, since the plurality of spacers 22 constituting the outermost layer part 51 and the auxiliary receiving members 67 receive the inner molds 63, a pressure of the fresh concrete acting on the inner molds 63 is received by the spacers 22 and the auxiliary receiving members 67. Consequently, the storage assembly 20 can be assuredly prevented from deforming at the time of pouring the fresh concrete into the space between the inner molds 63 and the outer mold 66. Moreover, since the operation to construct the storage assembly 20, the operation to construct the side-wall formation member 60, and the operation to form the side wall can be substantially simultaneously performed, even an unskilled operator can form the concrete side wall 13 in a relatively short time by the relatively simple method as described above. Here, since the concrete side wall 13 is supported by the storage assembly 20 in the storage tank 10, the thickness of the side wall 13 can be suppressed to the requisite minimum. Additionally, since the side wall 13 can be appressed against and formed to the upper surface of the bottom plate 12 by water swelling of the water stop material 74, the bottom plate 13 and the side wall 13 which are made of concrete and the water stop material 74 interposed between the bottom plate 12 and the side wall 13 can prevent the rain water and the like in the storage tank 10 from leaking when the rain water and the like are stored in the storage tank 10. Further, since a space between the hole 11 dug in the ground and the outer surface of the side wall 13 is backfilled with soil, a relatively large partial pressure in the horizontal direction in the earth pressure acts on the outer peripheral surface of the storage tank 10. However, since the structurally robust concrete side wall 13 receives the partial pressure, the storage assembly 20 can be prevented from being damaged.

Second Embodiment

Figure 12:
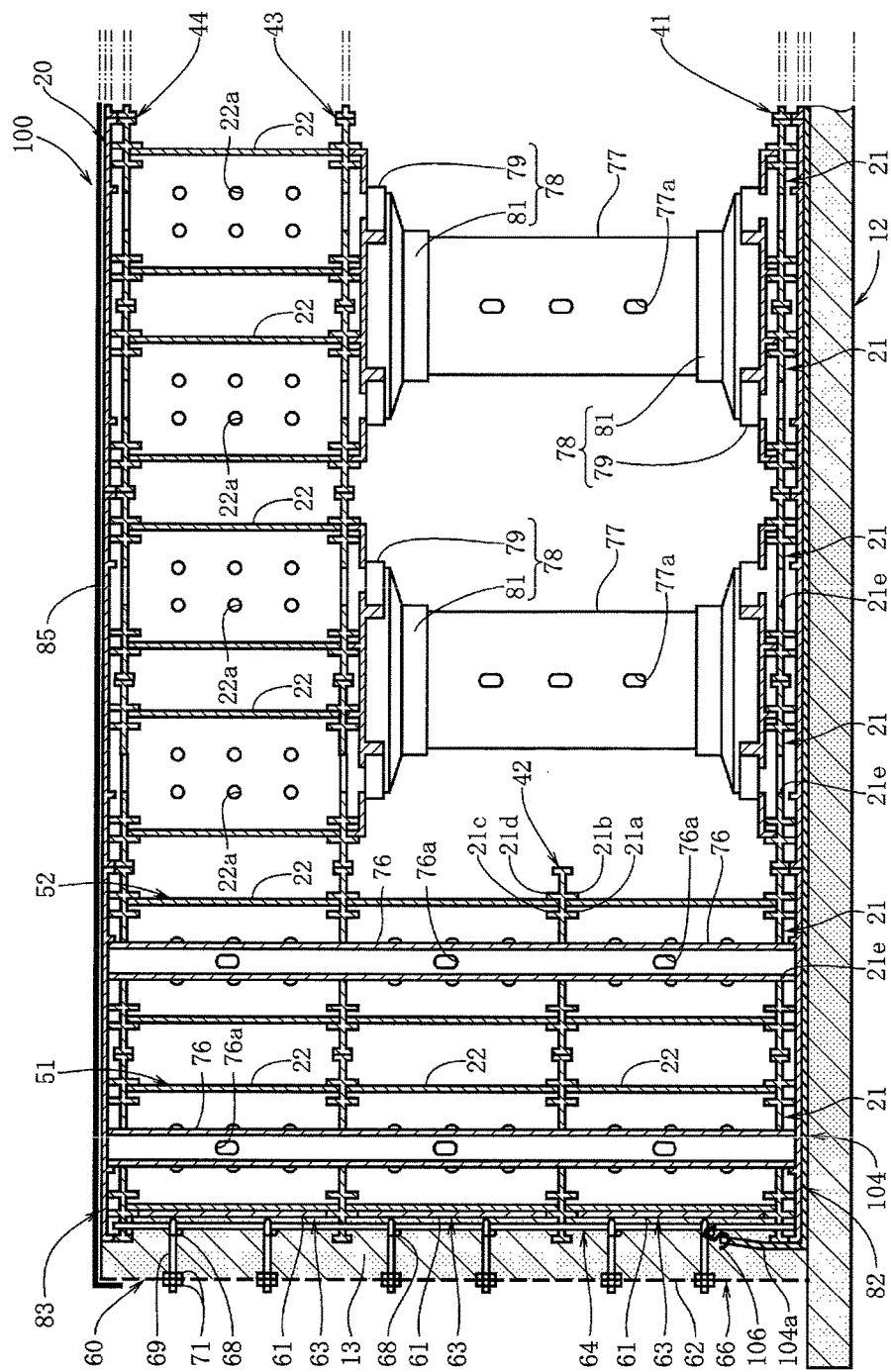
FIG. 12 is a cross-sectional view which shows a storage tank according to a second embodiment of the present invention and corresponds to FIG. 1.

FIG. 12 shows a second embodiment. In FIG. 12, numerals equal to those in FIG. 1 denote like components. In this embodiment, an impervious sheet 104 is laid on a bottom plate 12, and a peripheral edge of the impervious sheet 104 is raised by a predetermined length and buried in a side wall 13. The impervious sheet 104 is formed to be wider than a bottom surface of a storage assembly 20. Specifically, the impervious sheet 104 is preferably formed to be larger than the storage assembly 20 by 5 to 50 cm or preferably approximately 10 to 40 cm from an end portion of the storage assembly 20, namely, a raised portion 104a of the impervious sheet 104 is preferably formed to have a height of 5 to 50 cm or more preferably a height of approximately 10 to 40 cm. Furthermore, the peripheral edge of the impervious sheet 104 is raised and locked to a horizontal reinforcing bar 68 on the lowermost step by an S-shaped hook 106. Specifically, a hole (not shown) is formed in an upper edge of the raised portion 104a of the impervious sheet 104, one end of the S-shaped hook 106 is locked in this hole, and the other end of the S-shaped hook 106 is locked to the horizontal reinforcing bar 68 on the lowermost step. Other structures are the same as those in the first embodiment.

A description will now be given as to steps including construction of the impervious sheet 104 in the method for constructing the thus configured storage tank 100. First, after a bottom plate laying step and before a storage assembly constructing step, the impervious sheet 104 wider than a bottom surface of the storage assembly 20 is laid on the bottom plate 12. Moreover, after a vertical reinforcing bar inserting step and before an outer mold forming step, the plurality of horizontal reinforcing bars 68 are provided at intervals in the vertical direction in such a manner that the horizontal reinforcing bars cross the vertical reinforcing bars 64, and these horizontal reinforcing bars 68 are fixed at portions where thy cross the vertical reinforcing bars 64 by using binding wires (not shown). Then, the peripheral edge of the impervious sheet 104 is raised, and an upper edge of this raised portion 104a is locked to the horizontal reinforcing bar 68 on the lowermost step by using the S-shaped hook 106. Additionally, after the outer mold forming step, when fresh concrete is poured into a space between inner molds 63 and an outer mold 66 and hardened, the raised portion 104a of the impervious sheet 104 is buried in the side wall 13 in a raised state. Here, when the fresh concrete is poured into the space between the inner molds 63 and the outer mold 66, a weight of the fresh concrete acts on the raised portion 104a of the impervious sheet 104 in a direction to squash the raised portion 104a, but the raised portion 104a is fixed to the horizontal reinforcing bar 68 on the lowermost step through the S-shaped hook 106, and hence the raised portion 104a is maintained in the raised state. The method for constructing the storage tank 100 other than that described above is substantially the same as the method for constructing a storage tank according to the first embodiment, and hence a repetitive description will be omitted.

In the thus constructed storage tank 100, since the raised portion 104a of the impervious sheet 104 is buried in the side wall 13 in the raised state, the impervious sheet 104 on the concrete bottom plate 12 and the concrete side wall 13 can assuredly prevent rain water and the like in the storage tank 100 from leaking when the rain water and the like are stored in this storage tank 100.

It is to be noted that, in the first and second embodiments, the horizontal coupled bodies are provided on three steps, but the horizontal coupled bodies may be provided on two steps or on four or more steps. Further, in the first and the second embodiments, the partition plates on the inner side of the inside outer layer part are arranged to skip one step in the vertical direction, but the inside outer layer part may be eliminated when the earth pressure from the upper surface of the storage tank is relatively small, namely, the partition plates on the inner side of the outermost layer part may be arranged to skip one step in the vertical direction.

REFERENCE SIGNS LIST 10, 100 storage tank
11 hole dug in the ground
12 bottom plate
13 side wall
20 storage assembly
21 partition plate
21a to 21d cylindrical rib
22 spacer
51 outermost layer part
60 side-wall formation member
61 first plate member (plastic corrugated board)
62 second plate member (steel netting)
63 inner mold
64 vertical reinforcing bar
66 outer mold
67 auxiliary receiving member
68 horizontal reinforcing bar
69 separator
71 nut
74 water stop material
104 impervious sheet

The invention claimed is:

1. A storage tank comprising: a concrete bottom plate laid on a bottom part of a hole dug in the ground; a storage assembly provided on the bottom plate and accommodated in the hole; a concrete quadrangular tubular side wall provided around the storage assembly on the bottom plate; and a side-wall formation member configured to form the side wall into a square frame shape, wherein the storage assembly comprises: a plurality of square tabular partition plates each of which has at least one cylindrical rib protruded on a lower surface thereof and at least one cylindrical rib protruded on an upper surface thereof; a plurality of tubular spacers each of which is connected to one or both of the lower surface and the upper surface of each partition plate while being fitted to the cylindrical ribs; and an outermost layer part provided on the outermost side of the storage assembly by alternately arranging the partition plates and the spacers in a vertical direction, and the side-wall formation member comprises: multi-step inner molds formed into a quadrangular tubular shape by arranging a plurality of first plate members in such a manner that the first plate members come into contact with portions, which form an outer surface of the outermost layer part, of the plurality of tubular spacers constituting the outermost layer part in accordance with each step between the multi-step square tabular partition plates which constitute the outermost layer part and are arranged at intervals in the vertical direction; a plurality of vertical reinforcing bars inserted into the multi-step square tabular partition plates which constitute the outermost layer part and are arranged at intervals in the vertical direction in such a manner that the vertical reinforcing bars are placed on the outer side of the plurality of first plate members; and a single-step outer mold formed into a quadrangular tubular shape by holding a plurality of second plate members, which are arranged on the outer side of the multi-step square tabular partition plates which constitute the outermost layer part and are arranged at intervals in the vertical direction, by a plurality of separators to form a predetermined gap between the second plate members and the vertical reinforcing bars.

2. The storage tank according to claim 1, wherein a water stop material having water swelling properties is arranged on the bottom plate between the inner molds and the outer mold, and the side wall is appressed against and formed on an upper surface of the bottom plate through the water stop material by pouring fresh concrete into a space between the inner molds and the outer mold and hardening the fresh concrete.

3. The storage tank according to claim 1, wherein an impervious sheet is laid on the bottom plate, and a peripheral edge of the impervious sheet is raised by a predetermined length and buried in the side wall.

4. The storage tank according to claim 1, wherein auxiliary receiving members which receive the inner molds together with the plurality of tubular spacers constituting the outermost layer part are inserted into the multi-step square tabular partition plates which constitute the outermost layer part and are arranged at intervals in the vertical direction.

5. The storage tank according to claim 1, wherein each first plate member is a plastic corrugated board material, and each second plate member is a steel netting.

6. The storage tank according to claim 5, wherein a distal end of each separator is bent into a U-like shape to be lockable to each vertical reinforcing bar, and a proximal end of each separator is fixed to each steel netting by inserting the proximal end of each separator into each mesh of the steel netting and screwing nuts to the proximal end of each separator.

7. A method for constructing a storage tank, comprising: laying a concrete bottom plate on a bottom part of a hole dug in the ground; constructing a storage assembly on the bottom plate and accommodating the storage assembly in the hole; constructing a side-wall formation member configured to form a concrete quadrangular tubular side wall surrounding the bottom assembly on the bottom plate; and forming the side wall by pouring fresh concrete into a space between inner molds and an outer mold of the side-wall formation member and hardening the fresh concrete,
wherein a plurality of square tabular partition plates each of which has at least one cylindrical rib protruded on a lower surface thereof and at least one cylindrical rib protruded on an upper surface thereof and a plurality of tubular spacers each of which is connected to one or both of the lower surface and the upper surface of each partition plate while being fitted to the cylindrical ribs are prepared before constructing a storage assembly on the bottom plate and accommodating the storage assembly in the hole,
constructing a storage assembly on the bottom plate and accommodating the storage assembly in the hole comprises providing an outermost layer part by alternately arranging the partition plates and the spacers in a vertical direction on the outermost side of the storage assembly,
constructing a side-wall formation member configured to form a concrete quadrangular tubular side wall surrounding the bottom assembly on the bottom plate comprises: forming each of multi-step inner molds into a quadrangular tubular shape by arranging a plurality of first plate members in such a manner that the first plate members come into contact with portions, which form an outer surface of the outermost layer part, of the plurality of tubular spacers constituting the outermost layer part in accordance with each step between the multi-step square tabular partition plates which constitute the outermost layer part and are arranged at intervals in the vertical direction; inserting a plurality of vertical reinforcing bars into the multi-step square tabular partition plates which constitute the outermost layer part and are arranged at intervals in the vertical direction in such a manner that the vertical reinforcing bars are placed on the outer side of the plurality of first plate members; and forming a single-step outer mold into a quadrangular tubular shape by holding a plurality of second plate members, which are arranged on the outer side of the multi-step square tabular partition plates which constitute the outermost layer part and are arranged at intervals in the vertical direction, by a plurality of separators to form a predetermined gap between the second plate members and the vertical reinforcing bars.

8. The method for constructing a storage tank according to claim 7,
constructing a side-wall formation member configured to form a concrete quadrangular tubular side wall surrounding the bottom assembly on the bottom plate further comprises arranging a water stop material having water swelling properties on the bottom plate between the inner molds and the outer mold, and the side wall is appressed against and formed on an upper surface of the bottom plate with the use of water swelling of the water stop material by pouring fresh concrete into a space between the inner molds and the outer mold and hardening the fresh concrete.

9. The method for constructing a storage tank according to claim 7,
wherein an impervious sheet wider than a bottom surface of the storage assembly is laid on the bottom plate after laying a concrete bottom plate on a bottom part of a hole dug in the ground and before constructing a storage assembly on the bottom plate and accommodating the storage assembly in the hole, and a plurality of horizontal reinforcing bars are provided at intervals in the vertical direction in such a manner that the horizontal reinforcing bars cross the vertical reinforcing bars and then a peripheral edge of the impervious sheet is raised and locked to the horizontal reinforcing bars after inserting a plurality of vertical reinforcing bars into the multi-step square tabular partition plates and before forming a single-step outer mold into a quadrangular tubular shape by holding a plurality of second plate members.

10. The method for constructing a storage tank according to claim 7, wherein auxiliary receiving members configured to receive the inner molds together with the plurality of spacers constituting the outermost layer part are inserted into the multi-step partition plates which constitute the outermost layer part and are arranged at intervals in the vertical direction before forming each of multi-step inner molds into a quadrangular tubular shape by arranging a plurality of first plate members in such a manner that the first plate members come into contact with portions.

11. The method for constructing a storage tank according to claim 7, wherein each first plate member is a plastic corrugated board material, and each second plate member is a steel netting.

12. The method for constructing a storage tank according to claim 11, wherein a distal end of each separator is bent into a U-like shape to be lockable to each vertical reinforcing bar, and a proximal end of each separator is fixed to each steel netting by inserting the proximal end of each separator into each mesh of the steel netting and screwing nuts to the proximal end of each separator.

* * * * *